United States Patent [19]
Bauer et al.

[11] 4,347,642
[45] Sep. 7, 1982

[54] WIPER ARM

[75] Inventors: Kurt Bauer, Ingersheim; Christian Roth, Bietigheim-Bissingen, both of Fed. Rep. of Germany

[73] Assignee: ITT Industries, Inc., New York, N.Y.

[21] Appl. No.: 233,661

[22] Filed: Feb. 11, 1981

[30] Foreign Application Priority Data

Feb. 19, 1980 [DE] Fed. Rep. of Germany ....... 3006188

[51] Int. Cl.³ .............................................. B60S 1/34
[52] U.S. Cl. .............................. 15/250.35; 15/250.31; 403/284; 29/432.2; 29/509
[58] Field of Search ............ 15/250.35, 250.2, 250.32, 15/250.31, 250.34; 403/282, 284; 29/432.1, 432.2, 509

[56] References Cited

U.S. PATENT DOCUMENTS 1,613,319 1/1927 Fuchs .......................... 15/250.35 X
1,942,661 1/1934 Paulus ......................... 15/250.35 X

FOREIGN PATENT DOCUMENTS 2031848 1/1972 Fed. Rep. of Germany .

*Primary Examiner*—Peter Feldman
*Attorney, Agent, or Firm*—James B. Raden; Donald J. Lenkszus

[57] ABSTRACT

A windshield wiper arm is described wherein a press fit connection is provided between the wiper rod and a link. The rod carries projections which bite into the softer material of the link.

8 Claims, 7 Drawing Figures

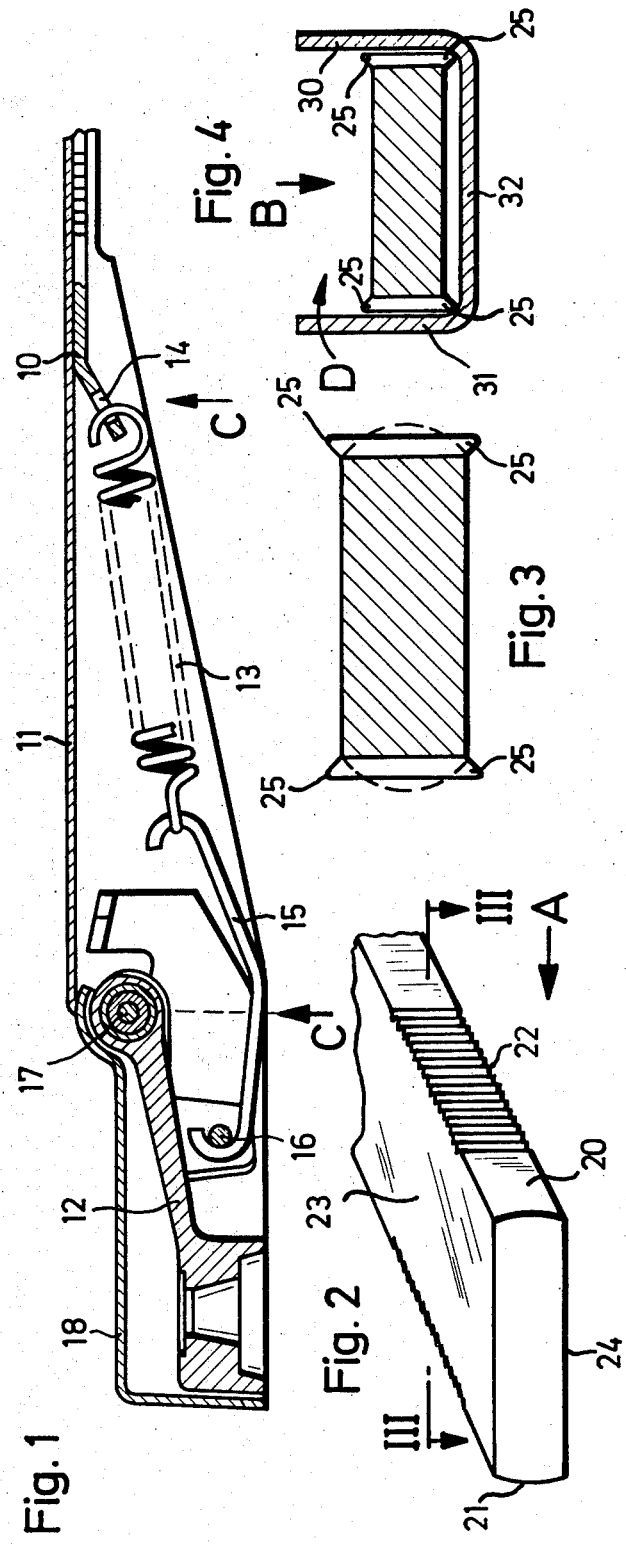
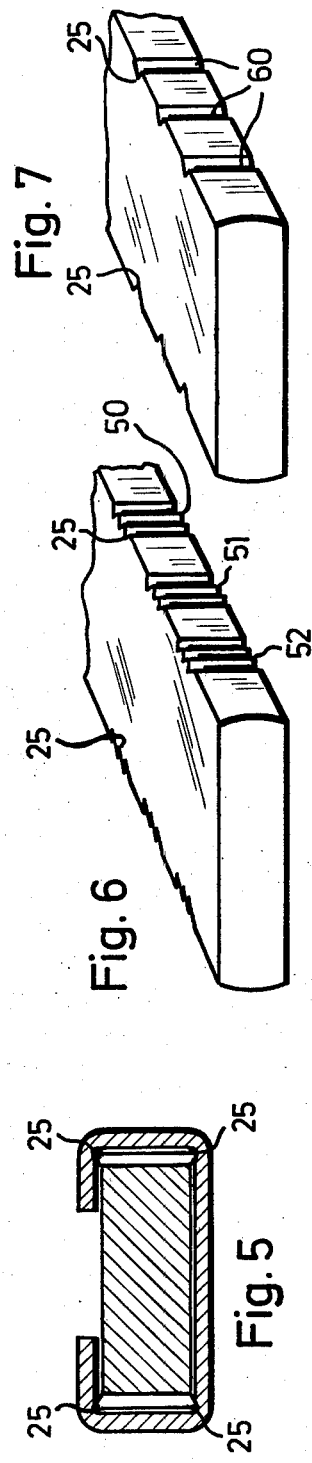

WIPER ARM

BACKGROUND OF THE INVENTION

The invention pertains to a windshield wiper arm and a method of manufacturing it.

In the present windshield wiper assemblies, the wiper rod and the link of wiper arms are connected by a rivet. For this purpose both the link and the wiper rod have to be provided with apertures for the rivet body. Therefore additional manufacturing steps and tooling are necessary. The link surface can be easily damaged during the riveting operation, so that an additional varnishing is sometimes necessary. Furthermore, it is disadvantageous that the rivet head projects from the link surface and thus the wiper arm does not meet all requirements from a styling point of view.

One significant problem with wiper arms including a rivet connection is that the contact pressure brought about by the spring element, usually a pull spring, does not meet the requirements with respect to exactness. More specifically, the spacing of the aperture for the rivet body in the link from the junction point of the link on the fastening member is subject to tolerances. Additionally, the spacing between the aperture for the rivet body in the wiper rod and the aperture into which the pull spring is suspended will also vary with production tolerances. The production tolerances may add up such that the spacing between the suspension points of the pull spring on the fastening member and on the wiper rod does not have the required dimension. Since the spacing between the suspension points of the pull spring determines the contact pressure, the contact pressure will be affected.

German patents DE-OS Nos. 20 31 848, 21 52 977 and 21 59 267 teach wiper arms in which a rivet is not needed to connect the wiper rod and link but the wiper rod still has apertures into which projections engage which are cut out or pressed out of the link. In the wiper arm according to DE-OS No. 21 59 267, lugs are pressed out of the lateral surfaces of the wiper rod which engage corresponding grooves in the side walls of the link. In all of these wiper arms the stability of dimensions of the apertures and projections determine the spacing of the suspensions points and thus the contact pressure.

The invention is based on the problems of providing a wiper arm in which the suspension points of the spring element have a spacing which is exactly adjustable and which can be produced economically.

SUMMARY OF THE INVENTION

In accordance with the principles of the invention, a wiper rod is provided with projections which dig into the side walls of a link formed of a relatively soft material. In an embodiment according to the invention, the spacing between the suspension point of the pull spring on the wiper rod and the junction point between the link and the fastening is determined by displacing the wiper rod in a longitudinal direction relative to the link as required.

In certain embodiments of the invention the lateral surfaces or the wider front surfaces of the wiper rod are provided with a cut-in or milled-in toothing. The sharp-edged teeth do not project beyond the surface of the wiper rod. However, by exertion of an appropriate force these teeth dig into the material of the link. In one embodiment according to the principles of the invention, sharp-edged projections are provided, for example, by embossing and these projections project from the surface of the wiper rod. In this manner, stable positive locking between wiper rod and link is achieved. The force required to separate the wiper rod from the link in longitudinal direction of the wiper rod has been found to be as much as twice as great as in riveted versions.

Further in accordance with the invention, the sharp-edged projections may project from the lateral surfaces or from the front surfaces of the wiper rods. In an advantageous embodiment, toothing is engraved into the narrow lateral surfaces of the wiper rod whereby the sharp-edged projections are formed by embossing and project from at least one front surface of the wiper rod. The material deformation is not as great as in other embodiments in which the toothing is provided on the broader front surfaces and therefore a lower assembly force is required.

Experiments showed that it is sufficient when sharp-edged projections project from only one front surface. In a preferred embodiment the sharp-edged projections project from the front surface of the wiper rod onto which the bordered sections of the side walls are pressed later. This embodiment has the advantage that the opposite front surface of the wiper rod remains smooth and the wiper rod can then be inserted into the U-shaped link without any hindrance and be displaced in longitudinal direction.

BRIEF DESCRIPTION OF THE DRAWINGS

The invention will be better understood from a reading of the following detailed description in conjunction with the drawings in which:

FIG. 1 is a longitudinal section through a wiper arm;

FIG. 2 is a perspective view of a section of the wiper rod;

FIG. 3 is a section through the wiper rod taken on the line III—III of FIG. 2;

FIG. 4 is a section through the wiper rod after insertion into the link;

FIG. 5 is a section corresponding to that of FIG. 4 after the side walls of the link have been bordered;

FIG. 6 is a wiper rod with various groups of teeth; and

FIG. 7 is a wiper rod with single teeth.

DETAILED DESCRIPTION

In the wiper arm according to FIG. 1 the wiper rod is designated by 10, the link by 11, the fastening member by 12 and the pull spring by 13. The pull springs brings about the contact pressure as a spring element. The pull spring 13 is suspended at one end in an opening 14 of the wiper rod 10 and at the other end on the web 16 of the fastening member 12 via a yoke 15. The link 11 and the fastening member 12 are connected with each other in a well known manner. A cover 18 made of plastic material covers the connection between link and wiper shaft, which is not shown in detail.

It can be seen from FIG. 2 that into the narrow lateral surfaces 20 and 21 a toothing is engraved. This toothing is produced in such a way that correspondingly shaped stamps are pressed onto the lateral surfaces 20, 21 in direction of arrow A. During this embossing operation material flows towards the front surfaces 23, 24 of the wiper rod 10, so that on all four longitudinal edges sharp-edged projections 25 are created which project from the surface of the wiper rod as it is shown in FIG. 3 in an exaggerated manner. These projections 25 are assigned to the space widths of the toothing 22.

The wiper rod 10 is inserted into the link according to FIG. 4. The link 11 has a substantially U-shaped cross-section with two side walls 30 and 31 and a web 32. The link is bent from sheet metal, whereby this material has a lower hardness than the wiper rod. Afterwards the exact position is fixed by a tool not shown in detail after an appropriate longitudinal displacement of the wiper rod 10 in the link 11. The tool could for instance be provided with mandrils which on the one hand engage into the opening 14 of the wiper rod and on the other hand into the bores for the pivot pin 17 on the link respectively as this is shown symbolically by the arrows C in FIG. 1. In this manner the contact pressure is exactly determined as well. Thereafter a pressure is exerted on the wiper rod in direction of arrow B in FIG. 4, so that the lower sharp-edged projections dig into the web 32 of the link. Then the side walls 30 and 31 are bent in direction of arrow D in the area of the function point between wiper rod and link. Thereby the upper projections 25 also dig into the bordered lugs of the side walls of the link 11. From the sectional view according to FIG. 5, it can clearly be seen that in this manner a positive locking between wiper rod 10 and link 11 is created. The forces normally appearing during wiper operation are insufficient to detach this locking between wiper rod and link.

In the embodiments according to FIGS. 1 to 5, the side walls of the wiper rod are provided with a toothing in the area of the junction point with the link, which toothing extends over a certain length.

In contrast thereto the embodiment according to FIG. 6 has various groups of teeth 50, 51 and 52, which each comprises several teeth. Between the groups of teeth the lateral surface remains undeformed over a certain length. The embodiment according to FIG. 7 shows that it is also possible to engrave into the lateral surfaces of the wiper rod single teeth only. These two versions do meet all requirements with respect to stability, when two or more groups of teeth and teeth respectively are provided on both sides of the wiper rod.

In all the versions shown in the drawings the sharp-edged projections are projecting from both front surfaces of the wiper rod 10. However, embodiments are conceivable too, into which for instance teeth are pressed into the lateral surfaces or into the front surfaces by a press tool for instance conducted transversally towards the wiper rod, so that sharp-edged projections are only created on two opposite edges between a front surface and the lateral surfaces. Thereby it is not necessary that the teeth extend over the entire lateral surface. Such versions will be preferred in particular cases, because less deformation work is necessary.

What is claimed is:
1. A wiper assembly comprising:
   a wiper rod having a substantially rectangular cross-section and formed of relatively hard material;
   a link formed of relatively soft material, said link having a substantially U-shaped cross section comprising a web and two side walls;
   a fastening member; and
   a spring element attached between said fastening member and said wiper rod to provide contact pressure;
   said wiper rod having engraved toothing on a first lateral surface and having sharp edged projections on one front surface adjacent said lateral surface, said projections and said toothing being adapted to dig on bite into said link whereby when said link and said wiper rod are assembled, said projections and said toothing are embedded into said link such that said link and said wiper rod are lockingly engaged.

2. A wiper arm in accordance with claim 1 wherein at least one of said sidewalls includes a portion engaging said one front surface, and said projections dig on bite into said portion.

3. A wiper arm in accordance with claim 1 wherein said projections engage said web.

4. A wiper arm in accordance with claims 1, 2 or 3 wherein said toothing is formed uniformly over a predetermined length of said wiper rod.

5. A wiper arm in accordance with claims 1, 2 or 3 wherein said toothing comprises a plurality of groups of teeth.

6. A wiper arm in accordance with claims 1, 2 or 3 wherein said toothing comprises two or more single teeth engraved a predetermined distance apart.

7. A method for manufacturing a wiper arm comprising the steps of:
   engraving toothing into one or more lateral surfaces of a wiper rod having a substantially rectangular cross-section such that a sharp edged projection is provided which projects from a surface of the wiper rod adjacent said lateral surface;
   inserting said wiper rod into a link having a web and two sidewalls;
   bringing the upper portion of the sidewalls of the link into engagement with said wiper rod opposite such that said projections dig on bite into said web.

8. A method according to claim 7 wherein said projections extend from the surface of said wiper rod adapted to engage said webs and said method includes the step of pressing said wiper rod against said web so that said projections dig or bite into said web before the step of bending the upper portion of said sidewalls.

* * * * *